US012645072B2

(12) United States Patent
Wu

(10) Patent No.: US 12,645,072 B2
(45) Date of Patent: Jun. 2, 2026

(54) ACHROMATIC OPTICAL SUBASSEMBLY

(71) Applicant: EZCONN CORPORATION, New Taipei City (TW)

(72) Inventor: Chin-Tsung Wu, New Taipei City (TW)

(73) Assignee: EZCONN CORPORATION, New Taipei City (TW)

( * ) Notice: Subject to any disclaimer, the term of this patent is extended or adjusted under 35 U.S.C. 154(b) by 1112 days.

(21) Appl. No.: 17/698,272

(22) Filed: Mar. 18, 2022

(65) Prior Publication Data

US 2022/0308340 A1 Sep. 29, 2022

(51) Int. Cl.
| | |
|---|---|
| *G02B 27/00* | (2006.01) |
| *G01B 9/02091* | (2022.01) |
| *G02B 1/00* | (2006.01) |
| *G02B 6/38* | (2006.01) |
| *G02B 6/42* | (2006.01) |

(52) U.S. Cl.
CPC ..... *G02B 27/0025* (2013.01); *G01B 9/02091* (2013.01); *G02B 1/002* (2013.01); *G02B 6/4206* (2013.01); *G02B 6/4263* (2013.01); *G02B 6/4292* (2013.01); *G02B 6/3853* (2013.01); *G02B 6/3874* (2013.01)

(58) Field of Classification Search
CPC .. G02B 27/0025; G02B 1/002; G02B 6/4206; G02B 6/4263; G02B 6/4292; G02B 6/3853; G02B 6/3874; G02B 2006/12159; G02B 7/04; G02B 6/4204; G02B 6/425; G02B 27/10; G01B 9/02091; G01N 21/25
See application file for complete search history.

(56) References Cited

U.S. PATENT DOCUMENTS

2020/0191550 A1* 6/2020 Walecki ............. G01B 9/02044
2021/0173143 A1* 6/2021 Diao .................. G02B 6/02319

* cited by examiner

*Primary Examiner* — Leslie C Pascal
(74) *Attorney, Agent, or Firm* — Min-Lee Teng

(57) ABSTRACT

An achromatic optical subassembly is suitable for connecting with an optical fiber. The achromatic optical subassembly includes a light-emitting unit, a light guide unit and an achromatic unit. The light-emitting includes a light source with broad spectral width used for optical fiber, wherein the spectral width of the light source with broad spectral width is at least greater than 30 nm. The light guide unit is disposed opposite the light-emitting unit and includes a ferrule for the optical fiber to pass through. The achromatic unit is disposed between the light-emitting unit and the guide unit, wherein the light source with broad spectral width passes through the achromatic unit, after which the different wavelengths of the light source with broad spectral width traveling along the respective optical paths are brought to the same focus and incident on the optical fiber in the light guide unit.

14 Claims, 5 Drawing Sheets

ACHROMATIC OPTICAL SUBASSEMBLY

RELATED APPLICATIONS

This application claims priority to TW Application Ser. No. TW 110203082, filed on Mar. 23, 2021, which is incorporated herein by reference in its entirety.

TECHNICAL FIELD

The present invention is related to an optical subassembly, especially, related to an achromatic optical subassembly that can be applied to the field of optical coherence tomography.

BACKGROUND

Optical coherence tomography referred to as OCT provides a small, shallow range of high-resolution medical images that can be used in diagnosing ophthalmic diseases, fingerprint tomographic images for biometric identification, and biomedical related research such as skin test.

Referring to FIG. 1, the optical architecture of the OCT instrument is based on a Michelson interferometer. Upon splitting an initial incident light beam 91 with a beam splitter 92 into a reference beam 93 and a sample beam 94, the reference beam 93 and the sample beam are reflected back by a reference mirror 95 and a sample mirror 96, respectively, and then enter the photodetector 97. OCT instrument requires a low coherence light source 90 as the initial incident beam 91. To interfere, the beam scattered from the sample 96 must pass through the same optical path as the reference beam 93. By continuously altering the optical path traveled by the reference beam 93, it is possible to detect the backscattering sources from the sample 96 itself at different depths. A 2D or 3D OCT image can also be produced with horizontal scanning. In the above manner, tissue samples at different depths can be analyzed and marked in the interference signal based on the backscattering generated by structural differences, thus obtaining optical sectioning.

Referring to FIG. 2, a current transmitting optical subassembly referred to as TOSA transmits optical signals. The TOSA includes a laser chip 81, a lens 82 and an optical fiber 83. When a driving current is applied to the laser chip 81, the light beam is emitted from the laser chip's 18 light-emitting point. The light beam then passes through the lens 82 and is focused into a light spot, and the light spot enters the optical fiber 83 for transmission in the optical fiber 83, so that the light with signals or without signal can be transmitted. TOSA plays a key role in the conversion of optical signals and electrical signals. It is widely used for optical fiber applications due to its strong optical performance and small size. Using TOSA as the initial incident light source in the field of OCT has the advantage of making the OCT instrument develop towards a smaller size. However, the current TOSA only allows a light beam with narrow spectral width of less than 30 nm to enter the connected optical fiber, so the current TOSA cannot focus a light source with broad spectral width of 30 nm or more, such as those used in OCT, on the same focal point and incident on optical fiber after being refracted. Chromatic aberration is the phenomenon that the focal point is different on the optical axis, and the TOSA with this problem causes deficiencies, including beams with low coupling efficiency and incomplete optical spectrum.

SUMMARY

The purpose of the present invention is to provide an achromatic optical subassembly that can be applied to the field of optical coherence tomography.

The present invention provides an achromatic optical subassembly, suitable for connecting with an optical fiber, including a light-emitting unit, a light guide unit and an achromatic unit. The light-emitting unit includes a light source with broad spectral width used for optical fiber, wherein the spectral width of the light source with broad spectral width used for optical fiber is at least greater than 30 nm.

The light guide unit is disposed opposite the light-emitting unit and includes a ferrule for the optical fiber to pass through.

The achromatic unit is disposed between the light-emitting unit and the guide unit, wherein the light source with broad spectral width used for optical fiber passes through the achromatic unit, after which the different wavelengths of the light source with broad spectral width used for optical fiber traveling along the respective optical paths are brought to the same focus and incident on the optical fiber in the light guide unit.

In some embodiments, the achromatic optical subassembly further includes a tube, the tube defines an accommodating space and includes a front end portion and a rear end portion, the front end portion connects to the light guide unit, the rear end portion surrounds the light source with broad spectral width used for optical fiber, the achromatic unit is disposed in the accommodating space.

In some embodiments, the achromatic unit includes a first lens and a second lens. The first lens is disposed between the light-emitting unit and the light guide unit and has positive refractive power, a light entrance side surface of the first lens near optical axis is convex, a light exit side surface of the first lens near optical axis is convex. The second lens is disposed between the first lens and the light guide unit and has negative refractive power, a light entrance side surface of the second lens near optical axis is concave, a light exit side surface of the second lens near optical axis is convex.

In some embodiments, the light source with broad spectral width used for the optical fiber is a low coherence light source, and the wavelength of the light source with broad spectral width used for the optical fiber is ranging from 780 nm to 1410 nm.

In some embodiments, the light guide unit further includes a tail sleeve, one end of the tail sleeve is for inserting the ferrule, and the other end of the tail sleeve extends toward the light-emitting unit and defines a space, the achromatic unit is arranged in the space.

In some embodiments, the achromatic unit is meta-lens.

The present invention also provides alternative achromatic optical subassembly, suitable for connecting with an optical fiber, including a light-emitting unit, a light guide unit, a focusing lens and an achromatic unit. The light-emitting unit includes a light source with broad spectral width used for optical fiber, wherein the spectral width of the light source with broad spectral width used for optical fiber is at least greater than 30 nm.

The light guide unit is disposed opposite the light-emitting unit and includes a ferrule for the optical fiber to pass through. The focusing lens is disposed between the light-emitting unit and the light guide unit.

The achromatic unit is disposed between the focusing lens and the guide unit, wherein the light source with broad spectral width used for optical fiber passes through the focusing lens and the achromatic unit, after which the different wavelengths of the light source with broad spectral width used for optical fiber traveling along the respective optical paths are brought to the same focus and incident on the optical fiber in the light guide unit.

In some embodiments, the light guide unit further includes a tail sleeve, one end of the tail sleeve is for inserting the ferrule, and the other end of the tail sleeve extends toward the light-emitting unit and defines a space, the focusing lens and the achromatic unit are arranged in the space.

In some embodiments, the achromatic optical subassembly further includes a z-axis alignment sleeve, wherein the z-axis alignment sleeve is used to move the focusing lens and the achromatic unit relative to the light-emitting point of the light-emitting unit.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of achromatic optical subassembly incorporating aspects of the presently disclosed principles are illustrated by way of example, and not by way of limitation.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Figure 1:
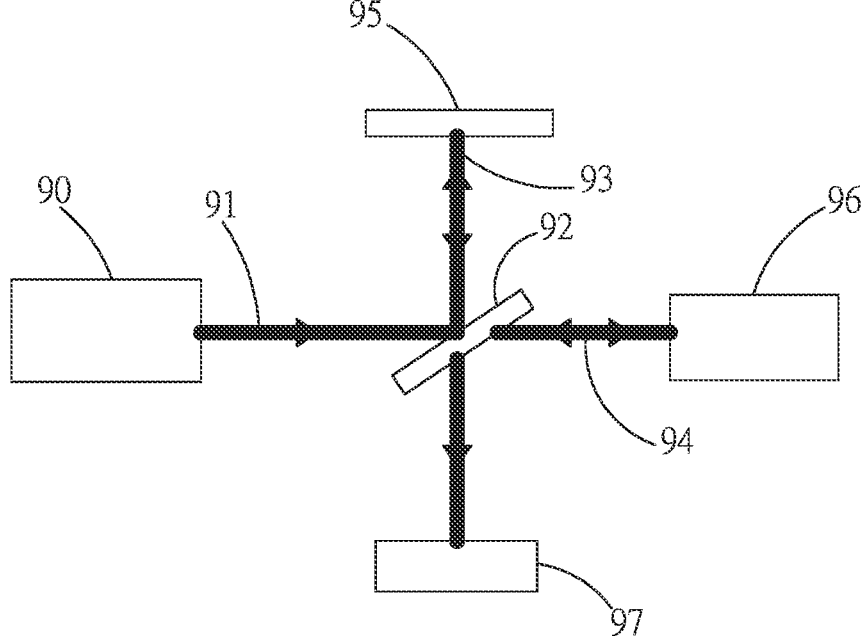
FIG. 1 illustrates a schematic diagram of the optical architecture of a Michelson interferometer.
Figure 2:
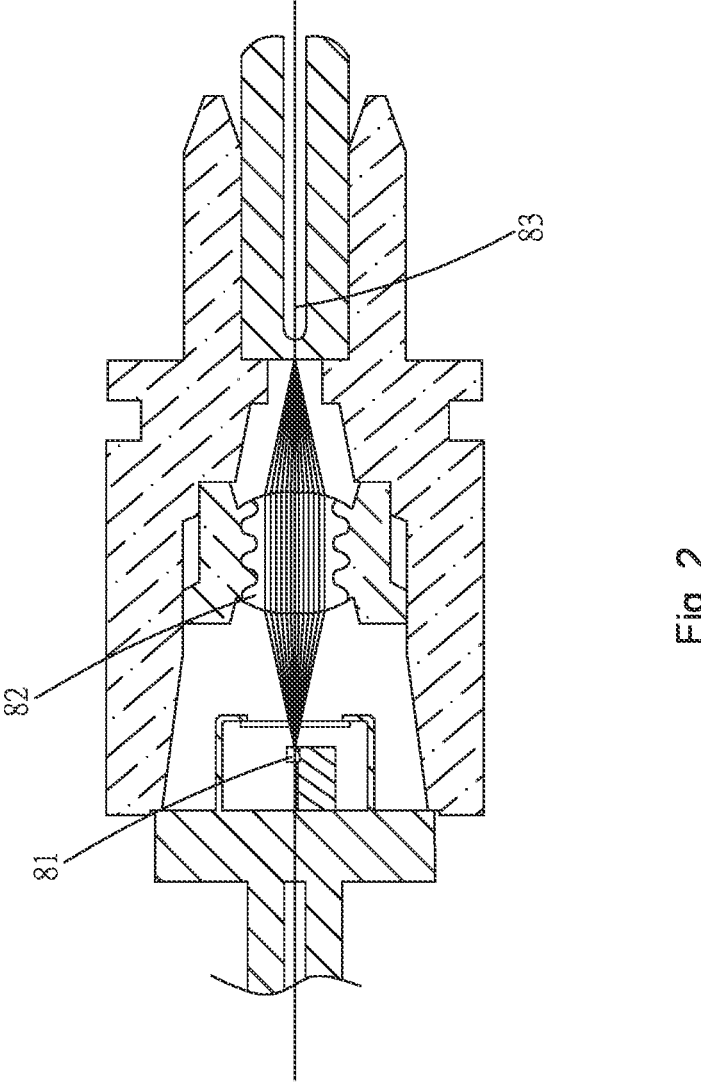
FIG. 2 illustrates a cross-section view of an embodiment of a conventional optical subassembly.
Figure 3:
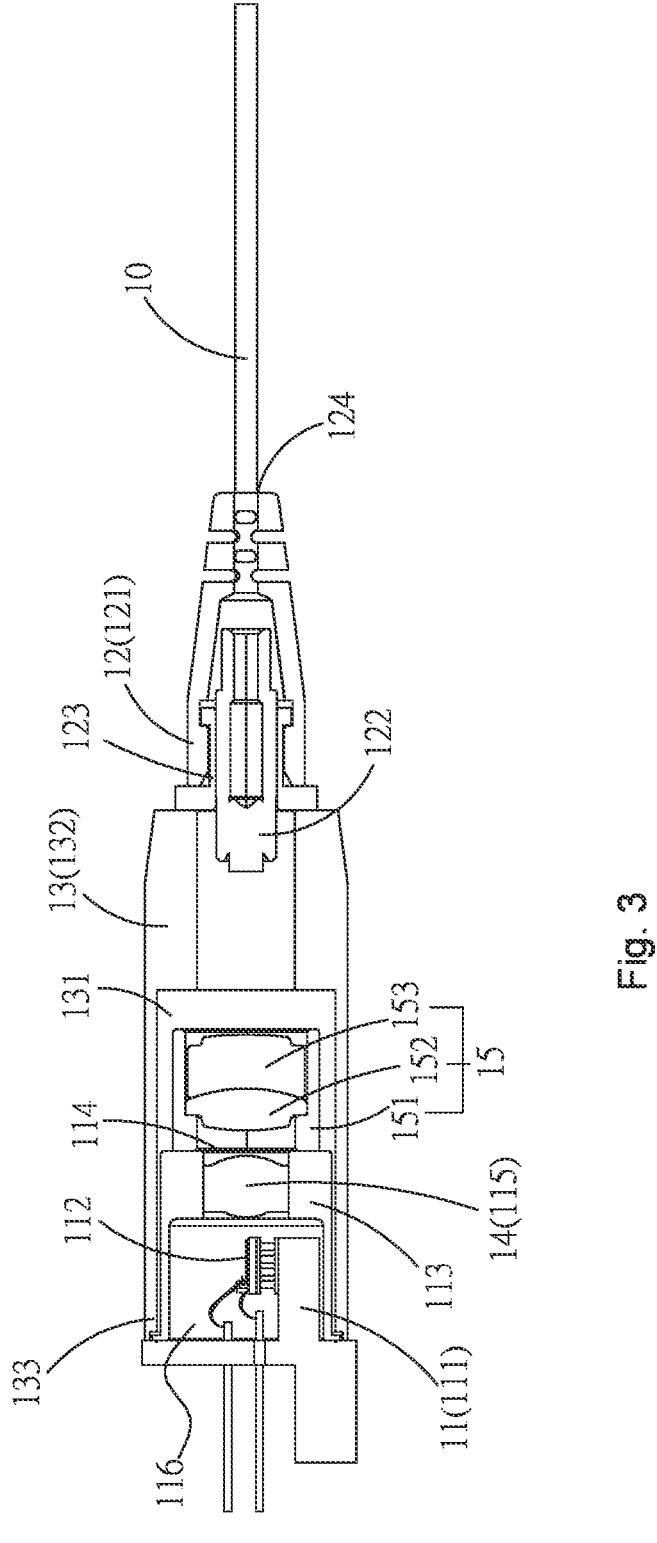
FIG. 3 illustrates a perspective view of a first embodiment of an achromatic optical subassembly of the present invention.

Referring to FIG. 3, a first embodiment of achromatic optical subassembly of the present invention is illustrated.

The achromatic optical subassembly is suitable for connecting with an optical fiber 10 and includes a light-emitting unit 11, a light guide unit 12, a tube 13, a focusing lens 14 and an achromatic unit 15.

The light-emitting unit 11 includes a header 111, a light-emitting chip 112 and a cover 113. The light-emitting chip 112 is disposed on the header 111 and emits a light source with broad spectral width used for optical fiber, wherein the spectral width of the light source with broad spectral width used for optical fiber is at least greater than 30 nm. For example, the spectral width is defined as full width at half maximum (FWHM), which is the wavelength interval between two points on the spectrum at which the amplitude of the center wavelength (the wavelength at which the relative luminous intensity is at its maximum) drops to half; or when the luminescence spectrum has two wave peaks, the spectral width is defined as the wavelength interval between one center wavelength and the other center wavelength. The light source with broad spectral width used for the optical fiber is a low coherence light source, whose wavelength has a specific range, which can range between 780 nm and 1410 nm. In addition, the wavelength selection of the light source with broad spectral width used for optical fiber is preferably the wavelength band located in the biological optical window so as to be used in OCT. The light-emitting chip 112 can be an LED chip that emits white light. Because it generates light with low coherence wavelengths, it can be applied in OCT, which is also known as white light interferometry. The light-emitting chip 112 can also be laser chip, however, said laser chip is not a single mode laser chip or does not have a narrow spectral width of less than 2 nm. For example, in the circuit design of said laser chip, two pulses are partially overlapped on the time axis in order to generate a light source with a wide pulse width, thereby obtaining the light source with broad spectral width used for optical fiber. Alternatively, blue shift or red shift phenomena can be used in the material selection for the laser chip, so that the available light source meet the requirement of broad spectral width. In this embodiment, the cover 113 is disposed close to the header 111 and surrounds the periphery of the light source with broad spectral width used for optical fiber. The cover 113 has a first opening 114 for the light source to exit, and a mounting space 115 adjacent to the first opening 114.

The light guide unit 12 is disposed opposite to the light-emitting unit 11. The light guide unit 12 includes a tail sleeve 121, a ferrule 122 through which the optical fiber 10 passes, and an axial alignment sleeve 123 connected to the tail sleeve 121 and the ferrule 122.

The tube 13 defines an accommodating space 131 and includes a front end portion 132 and a rear end portion 133. The front end portion 132 of the tube 13 is connected to the light guide unit 12 and surrounds part of the ferrule 122. The rear end portion 133 of the tube 13 surrounds the light source with broad spectral width used for optical fiber and the cover 113. In this embodiment, the tail sleeve 121 is of the pigtail type, but in other embodiments, the tail sleeve can be of a metal body of the receptacle type and omit the tube 13, that is, one end of the metal body is used for the ferrule inserted, and the other end is extended toward the header of the light-emitting unit, and the extended part surrounds the axis to form a space for the focusing lens 14 and the achromatic unit 15 to be accommodated, thereby becoming a plug-in type TOSA.

Referring to FIG. 3, the focusing lens 14 is located in the accommodating space 131 and is disposed between the light-emitting unit 11 and the light guide unit 12. In this embodiment, the focusing lens 14 is fixedly disposed in the mounting space 115 and is used to focus the light source with broad spectral width from the light-emitting chip 112, and the focusing lens 14 can be, for example, an aspheric lens.

The achromatic unit 15 is located in the accommodating space 131 and is disposed between the focusing lens 14 and the light guide unit 12. In this embodiment, the achromatic unit 15 includes a lens holder 151, a first lens 152 and a second lens 153. The interior of the lens holder 151 is stepped and used for arranging the first lens 152 and the second lens 153. One side of the lens holder 151 is closely connected to the cover 113. The first lens 152 is disposed between the light-emitting unit 11 and the light guide unit 12 and has a positive refractive power. A light entrance side surface of the first lens 152 near optical axis is convex, a light exit side surface of the first lens 152 near optical axis is convex. The second lens 153 is disposed between the first lens 152 and the light guide unit 12 and has negative refractive power. A light entrance side surface of the second lens 153 near optical axis is concave, a light exit side surface of the second lens 153 near optical axis is convex.

The following will understand the advantages of the present invention with the process of assembling and the use process:

In assembly, for example, the light-emitting chip 112 can be fixed on the surface of the header 111 first, and then the edge of the cover 113 can be welded to the periphery of the header 111 correspondingly, thereby forming a gas-filled space 116 between the header 111 and the cover 113. The light-emitting chip 112 is disposed in the gas-filled space 116, which is filled with nitrogen gas or another inert gas to prevent the light-emitting chip 112 from being damaged by moisture. In the mounting space 115 of the cover 113, the focusing lens 14 is embedded. By placing the focusing lens 14 here, the light source with broad spectral width can be focused to the same location.

In order to ensure that the light source with broad spectral width can actually be incident on the optical fiber 10 in the ferrule 122 during operation, during the process of fixing the lens holder 151 with the first lens 152 and the second lens 153 to the cover 113, the position of the lens holder 151 must be adjusted in the x-axis and the y-axis. In addition, the position of the light guide unit needs to be adjusted in the x-axis, y-axis and z-axis (optical axis direction), so as to complete the step of coupling light correction optical path in 5 axial degrees. In other embodiments, the cover 113 and the lens holder 151 can be integrally formed, thereby reducing the assembly process. The focusing lens 14 can be omitted, when the lens group of the achromatic unit 15 is designed to have a focusing function.

Following the step of positioning and fixing the lens holder 151 on the cover 113, fix the edge of the rear end portion 133 of the tube 13 on the header 111 and have the rear end portion 133 of the tube 13 surround the light source with broad spectral width. The front end portion 132 of the tube 13 is connected with the light guide unit 12. The front end of the tail sleeve 121 of the light guide unit 12 has a second opening 124, and the optical fiber 10 passes through the second opening 124 into the channel inside the ferrule 122. The depth of the ferrule 122 entering the front end 132 of the tube 13 is related to the final focus position of the light source with broad spectral width. A coaxial achromatic transmitter optical subassembly can be assembled using the assembly example above.

Figure 4:
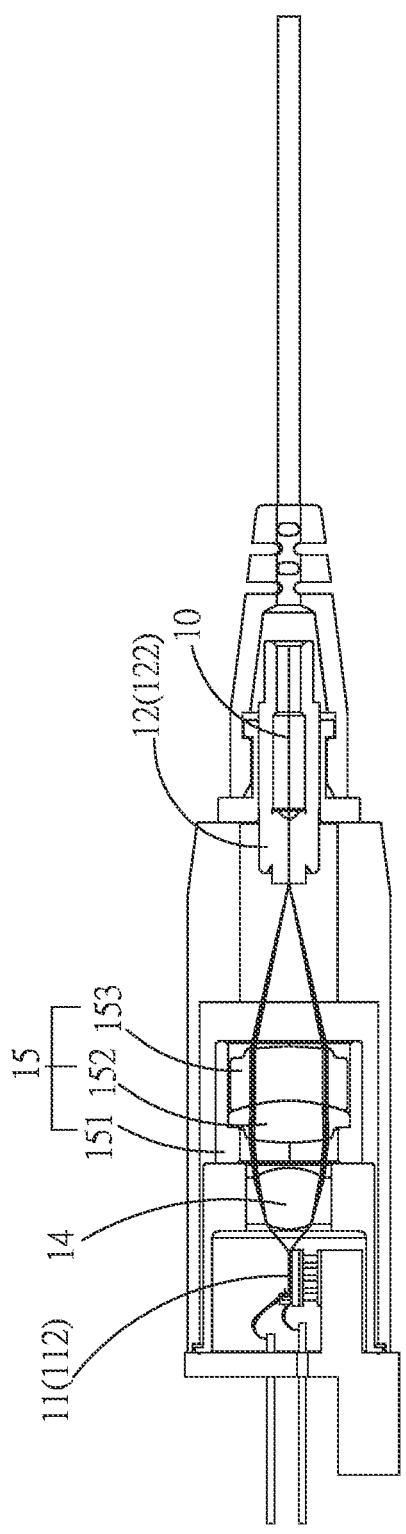
FIG. 4 illustrates a perspective view according to FIG. 3, wherein a light-emitting chip emits light beams with a wide spectral range in a variety of wavelengths, after passing through a focusing lens and an achromatic unit, the light beams of the different wavelengths traveling along their respective optical paths are brought to the same focus and incident on the optical fiber.

In use, for example, FIG. 4 illustrates an optical path of the light source with broad spectral width used for the optical fiber emitted by the light-emitting chip 112 of the achromatic transmitter optical subassembly of the present invention. The multiple wavelengths with broad spectral width emitted by the light-emitting chip 112 pass sequentially through the focusing lens 14 and the achromatic unit 15, afterward, the multiple wavelengths with broad spectral width traveling along their respective optical paths are brought to the same focus and incident on the optical fiber 10 inside the light guide unit 12. The light source emitted by the light-emitting chip 112 is a low coherence light source (with broad spectral width in the spectrum), resulting in optical path separation at the interface of different media. In the present invention, the achromatic unit 15 is designed to make the light of the separated paths recombine to the same path and focus on the same point on the optical axis, thereby eliminating chromatic aberration. Eventually, a refocused light source enters the optical fiber 10, further improving coupling efficiency and transmitting the complete spectrum of the light source. In this embodiment, the achromatic unit 15 is positioned between the light-emitting unit 11 and the light guide unit 12 in accordance with the positional relationship of each the component and its material properties. For example, the horizontal and vertical divergence angles of the light-emitting chip 112 (e.g., laser chip) are 14 degrees and 34 degrees, respectively; the distance between the light-emitting chip 112 and the achromatic unit 15 is about 4.5 mm; the distance between the achromatic unit 15 and the optical fiber 10 is about 6.6 mm; the material of the focusing lens 14 can be selected from D-ZK2; H-LAF50B and H-ZF72A can be selected as convex and concave lenses in the achromatic unit 15; and for the optical fiber 10, the maximum limit light receiving angle is 16 degrees, etc.

Additionally, it is worth mentioning that, as long as the objective of eliminating chromatic aberration can be achieved, the achromatic unit 15 of the present invention can also be a meta-lens. The meta-lens includes a plurality of nano-columns formed on a dielectric layer. The arrangement direction of the nano-columns can be controlled to eliminate the chromatic aberration. If the application only focuses on eliminating the chromatic aberration, the focusing lens 14 can also be removed.

Figure 5:
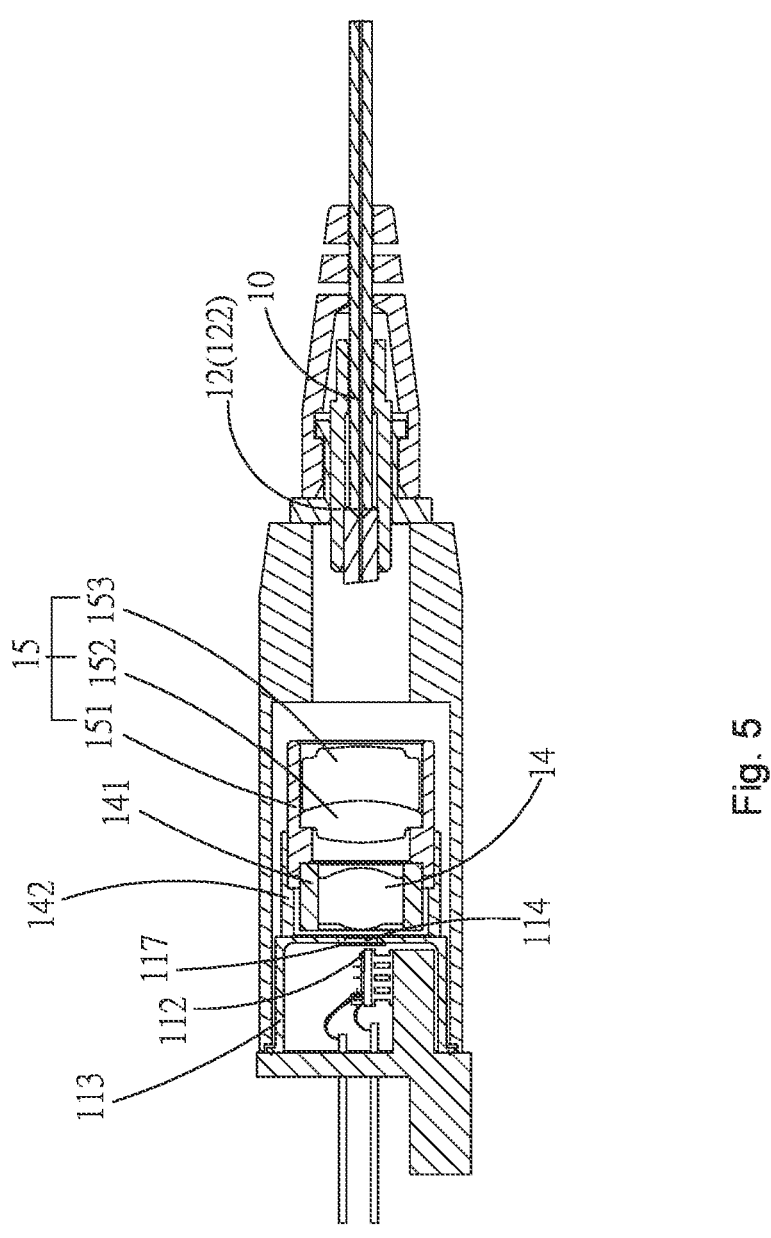
FIG. 5 illustrates a cross-section view of a second embodiment of an achromatic optical subassembly of the present invention.

Referring to FIG. 5, a second embodiment of achromatic optical subassembly of the present invention is illustrated. The second embodiment is similar to the first embodiment, the main differences are:

The cover 113 omits the mounting space for the focusing lens 14, and the first opening 114 of the cover 113 is covered by a transparent substrate 117, which can be plate glass. Through an annular holder 141, the focusing lens 14 is combined with the lens holder 151, which is connected with a z-axis alignment sleeve 142.

In assembly, as the focusing lens 14 and the achromatic unit 15 are fixed on the cover 113 through the z-axis alignment sleeve 142, the three degrees of freedom of the x-axis, y-axis and z-axis can be adjusted. Additionally, the x-axis, y-axis and z-axis (optical axis direction) of the light guide unit 12 are all adjusted simultaneously. Therefore, compared with the structure of the first embodiment, the second embodiment can adjust the 6-axis degree to complete the step of coupling light correction optical path. Since the light-emitting point of the light-emitting chip 112 reaches the first lens encountered, the change in distance between the two is extremely sensitive to the result of the coupled light measurement. In this embodiment, the focusing lens 14 and the achromatic unit 15 are fine-tuned relative to the light-emitting point of the light-emitting chip 112 through the z-axis alignment sleeve 142, which can enhance light coupling efficiency.

The achromatic transmitter optical subassembly of the present invention can not only be used in OCT but can also address chromatic aberration to improve the coupling efficiency and transmit the entire spectrum of the light source. The small dimensions of the achromatic transmitter optical subassembly make it possible to manufacture miniaturized OCT instruments and even portable OCT devices.

The present invention not only has better heat dissipation effectiveness, but also provides the effect of firmly fixing the transmission optical sub-assembly if combined with the light guide unit.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. An achromatic optical subassembly, suitable for connecting with an optical fiber, the achromatic optical subassembly including:
    a light-emitting unit, including a light source with broad spectral width, wherein the spectral width of the light source with broad spectral width is at least greater than 30 nm;

a light guide unit, disposed opposite the light-emitting unit, the light guide unit including a ferrule for the optical fiber to pass through; and
an achromatic unit, disposed between the light-emitting unit and the guide unit, wherein the achromatic unit includes a first lens and a second lens, the first lens is disposed between the light-emitting unit and the light guide unit and has positive refractive power, a light entrance side surface of the first lens is convex, a light exit side surface of the first lens is convex, the second lens is disposed between the first lens and the light guide unit and has negative refractive power, a light entrance side surface of the second lens is concave, a light exit side surface of the second lens is convex;
wherein the light source with broad spectral width passes through the achromatic unit, after which the different wavelengths of the light source with broad spectral width traveling along the respective optical paths are brought to the same focus and incident on the optical fiber in the light guide unit.

2. The achromatic optical subassembly of claim 1, further including a tube, the tube defining an accommodating space and including a front end portion and a rear end portion, the front end portion connecting to the light guide unit, the rear end portion surrounding the light source with broad spectral width, the achromatic unit disposed in the accommodating space.

3. The achromatic optical subassembly of claim 2, wherein the achromatic unit is meta-lens.

4. The achromatic optical subassembly of claim 1, wherein the light source with broad spectral width is a low coherence light source, and the wavelength of the light source with broad spectral width is ranging from 780 nm to 1410 nm.

5. The achromatic optical subassembly of claim 1, wherein the light guide unit further includes a tail sleeve, one end of the tail sleeve is for inserting the ferrule, and the other end of the tail sleeve extends toward the light-emitting unit.

6. The achromatic optical subassembly of claim 1, wherein the achromatic unit is meta-lens, wherein the meta-lens includes a plurality of nano-columns formed on a dielectric layer.

7. An achromatic optical subassembly, suitable for connecting with an optical fiber, the achromatic optical subassembly including:
    a light-emitting unit, including a light source with broad spectral width, wherein the spectral width of the light source with broad spectral width is at least greater than 30 nm;
    a light guide unit, disposed opposite the light-emitting unit, the light guide unit including a ferrule for the optical fiber to pass through;
    a focusing lens, disposed between the light-emitting unit and the light guide unit; and
    an achromatic unit, disposed between the focusing lens and the guide unit;
    wherein the light source with broad spectral width passes through the focusing lens and the achromatic unit, after which the different wavelengths of the light source with broad spectral width traveling along the respective optical paths are brought to the same focus and incident on the optical fiber in the light guide unit.

8. The achromatic optical subassembly of claim 7, wherein the light source with broad spectral width is a low coherence light source, and the wavelength of the light source with broad spectral width is ranging from 780 nm to 1410 nm.

9. The achromatic optical subassembly of claim 7, wherein the light guide unit further includes a tail sleeve, one end of the tail sleeve is for inserting the ferrule, and the other end of the tail sleeve extends toward the light-emitting unit.

10. The achromatic optical subassembly of claim 7, further including a z-axis alignment sleeve, wherein the z-axis alignment sleeve is used to move the focusing lens and the achromatic unit relative to the light-emitting point of the light-emitting unit.

11. The achromatic optical subassembly of claim 7, further including a tube, the tube defining an accommodating space and including a front end portion and a rear end portion, the front end portion connecting to the light guide unit, the rear end portion surrounding the light source with broad spectral width, the achromatic unit disposed in the accommodating space.

12. The achromatic optical subassembly of claim 11, wherein the achromatic unit includes a first lens and a second lens, the first lens is disposed between the light-emitting unit and the light guide unit and has positive refractive power, a light entrance side surface of the first lens is convex, a light exit side surface of the first lens is convex, the second lens is disposed between the first lens and the light guide unit and has negative refractive power, a light entrance side surface of the second lens is concave, a light exit side surface of the second lens is convex.

13. The achromatic optical subassembly of claim 11, wherein the achromatic unit is meta-lens.

14. The achromatic optical subassembly of claim 7, wherein the achromatic unit is meta-lens, wherein the meta-lens includes a plurality of nano-columns formed on a dielectric layer.

* * * * *